United States Patent Office

3,420,753
Patented Jan. 7, 1969

3,420,753
METHOD OF MEASURING THE ACTIVITY OF A CARBONYLATION REACTION
John Happel, Hastings on Hudson, and Hillard Blanck, Floral Park, N.Y., assignors to National Lead Company, New York, N.Y., a corporation of New Jersey
No Drawing. Filed Sept. 9, 1965, Ser. No. 486,220
U.S. Cl. 204—1                           11 Claims
Int. Cl. B01k 1/00

This invention relates to a means for determining the progress and activity level of carbonylation reactions, and more particularly, is a method for determining by electrical measurements, the progress of reactions between compounds containing one or more triple bonds, carbon monoxide or carbon monoxide yielding compounds, and compounds having at least one active hydrogen atom.

It is an object of this invention to provide a convenient method for following the progress of carbonylation reactions between acetylene compounds, carbon monoxide, and compounds containing active hydrogen atoms.

It is another object of the invention to provide a relatively simple and reliable method for measuring the level of activity of certain carbonylation reactions involving acetylene compounds.

A further object of the invention is for a method to avoid the slowing up and/or cessation of carbonylation reactions of acetylene compounds with carbon monoxide in the presence of active hydrogen compounds.

Another object of the invention is to provide a relatively simple method to control the level and activity of liquid phase reactions between acetylene or acetylene homologs with carbon monoxide and compounds containing active hydrogen atoms.

Another object is to provide a simple means for anticipating the termination or decrease in activity of carbonylation reactions in order to be able to maintain and control them.

More specific details and other objects of the invention will become evident from the disclosure following:

The carbonylation of acetylene to prepare acrylic acid esters according to the so-called Reppe "stoichiometric reaction" with a metal carbonyl, preferably nickel carbonyl, and an alkanol is well known. It has also been demonstrated that the acrylate esters can be prepared by the catalytic conversion of acetylene, carbon monoxide and a suitable alkanol, when this "catalytic reaction" is superimposed on an existing "stoichiometric reaction," for example, as described in U.S. Patent 2,582,911. Other metal carbonyls which can be used such as iron carbonyl, cobalt carbonyl, indium carbonyl can also be used.

When the two reactions are superimposed, carbon monoxide as reactant, enters the reactor in two forms; as carbon monoxide from the metal carbonyl and as carbon monoxide gas. The combined sources of monoxide are commonly referred to as "total carbon monoxide." It is believed that this is a more convenient and accurate term to use in describing accurately the limitation in the ratios of carbon monoxide to acetylene. In such superimposed reactions it is desirable, for economic reasons, to produce a relatively large proportion of the ester desired by the "catalytic reaction" as compared with that produced by the "stoichiometric reaction." Such relative proportions of these reactions are specified in terms of the molar ratio of carbonyl radical reacted from gaseous carbon monoxide to the total carbonyl radical reacted, termed the "percent catalytic" of the reactions.

It has also been more recently discovered that it is possible to carry out the stoichiometric reaction using methyl acetylene instead of the acetylene. The catalytic reaction can also be superimposed in the methyl acetylene reaction to give the corresponding methacrylate esters. However, methyl acetylene, unlike acetylene, is unsymmetrical about its triple bond, and, upon carbonylation by either the stoichiometric or catalytic reactions can again unlike acetylene, produce two different molecular configurations. Hence, when methyl acetylene is carbonylated, and then esterified with methanol, it is possible to produce either methyl methacrylate ($CH_2=C(CH_3)COOCH_3$) or methyl crotonate ($CH_3CH=CHCOOCH_3$) alone or in admixture.

In the manufacture of methyl acrylate from acetylene it appears experimentally that the most favorable temperature for high percent catalytic reactions are 40–45° C., while in the manufacture of methyl methacrylate, in order to obtain a high percent catalytic (for instance, 70% catalytic) a temperature greater than 47–50° C. must be used. At 45° C. during the carbonylation of methyl acetylene the maximum percent of the catalytic reaction obtainable is 60%.

Under the usual reaction conditions, for the stoichiometric reaction, hydrogen chloride is the limiting ingredient. All other reactants are metered in excess of that required to react with the hydrogen chloride. On the other hand, the other reactants, such as nickel carbonyl or methanol or other ester-forming alcohols, can vary to some extent in ratios used. However, the stoichiometric and catalytic reactions can be run with certain variations in the hydrogen chloride flow, but as the hydrogen chloride is varied, the percentage catalytic and extent of stoichiometric reaction change accordingly. Thus, a steady hydrogen chloride flow control using hydrogen chloride as the limiting reactant is a usual convenient and efficient way to control both the stoichiometric and catalytic reactions.

With acetylene, when the reaction itself shows symptoms of extinguishing, it can be revived or saved by increasing the flow of hydrogen chloride. On the other hand, this cannot be done using methyl acetylene. The effect of hydrogen chloride in this way has never been observed. The reaction involving acetylene is a much stronger and more vigorous one and is in fact, substantially easier to carry out than the methyl acetylene reaction.

In forming the esters from methyl acetylene it is preferable to use relatively large excesses of methanol and no excess of total carbon monoxide. In using methyl acetylene it has been found necessary to feed the methyl acetylene in excess of that required to react completely with the carbon monoxide gas fed to the reaction vessel. If excess carbon monoxide gas is fed to the reactor while conducting the catalytic reaction the existing stoichiometric reaction is immediately suppressed, resulting in cessation of both chemical reactions occurring in the process. It is therefore essential in reactions employing methyl acetylene that at least 1.01 mols (a slight excess) of methyl acetylene per mole of total carbon monoxide be present at all times within the reaction mixture. Moreover, it has been further found that the process cannot be carried out continuously at a high percent catalytic, i.e., above about 65% catalytic, when methyl acetylene is present in amounts greater than about 1.10 mols of methyl acetylene per mol of total carbon monoxide. Preferably, the mole ratio of methyl acetylene to total carbon monoxide gas in the reaction mixture is regulated at from about 1.01:1 to 1.05:1 in order to carry out the superimposed reactions and produce the methacrylate at greater than about 65% catalytic, without production of contaminating amounts of undesirable materials. With methyl acetylene, any excess of carbon monoxide kills both the catalytic and stoichiometric reactions.

It has been found that when running these carbonylation reactions in an excess of the active hydrogen compound and in the presence of metal carbonyls such as nickel carbonyl and an acid substance such as hydrogen chloride, the reaction will terminate without any apparent cause. To reinitiate the reaction requires a complicated start-up procedure which makes continuous operation difficult. A method has been discovered whereby the level of activity can be measured and the reaction controlled.

For instance, in the reaction between acetylene, carbon monoxide, and alkanol, to produce alkyl acrylates or that using methyl acetylene to produce methacrylates, any change in the flow rates or in reaction conditions may cause the reaction to terminate. It has been unexpectedly found that by measuring the electrical resistance or the conductance of the reacting mixture, its reactivity level can readily be ascertained. While the reaction is in progress the resistance is extremely low by comparison to the resistance before the reaction has been initiated and after it has terminated. The termination of the reaction is thus anticipated a few minutes before it actually occurs by a gradual increase in the resistance.

In order to carry out the method of the invention, the resistance, or conversely the conductance, of the reaction mixture can be measured by means of probes placed in the mixture and connected to a conventional Wheatstone bridge circuit. If more accurate measurements are desired an alternating current bridge can be used. The precise equipment required is not critical. So long as it is a method for measuring resistance or conductance of the system.

As a typical example for use in the Wheatstone bridge circuit, a Simpson No. 260 resistance meter can be used. $R_1$, $R_2$, $R_3$, and $R_x$ may be used to represent the four resistances of the circuit.

In operation $R_x$ represents the resistance of the conductivity cell in solution. To standardize the apparatus $R_x$ is short circuited and $R_2$ is adjusted so that the meter M reads 0 at the right side. Actually in this condition there is a maximum imbalance between the legs of the circuit. With $R_x$ resuming its function of measuring the resistance of the solution the meter will read higher than zero. This reading can be calibrated to measure resistance, conductivity, or specific conductivity, depending upon the cell geometry.

While for relative measurements the D.C. bridge has proven satisfactory more accurate measurements are obtainable using an A.C. Bridge.

It has been found that when the carbonylation reaction is running smoothly, the resistance of the mixture is very low. When the reaction starts, the resistance of the reacting mixture drops strikingly and remains low so long as the reaction is in progress at substantial rates. When the carbonylation reaction slows up or is about to terminate, the resistance of the mixture undergoes an unexpected rise. It is these changes in resistance which can be used to detect the level of reactivity, control, and predict the dropping off or termination of the reaction. Conversely, the conductance of the mixture which rises when the resistance falls, can be used to detect and control in a like manner.

The method of the invention is particularly useful in operating the carbonylation processes in a continuous manner or in operating at the low levels of activity but without premature termination.

The following examples illustrate the use of the invention in the preparation of methyl and ethyl methacrylates and describe in detail some embodiments for the reaction. It will be appreciated that these examples are illustrative of the preparation of acrylic acid esters and methacrylic acid esters and that the invention is not intended to be specifically limited thereto.

Example 1(a)

An initial charge of 1300 cc. methanol was added to a reactor fitted with suitable agitation means, heating coils, inlet feed lines and product drain lines. The other reactants were metered into the reactor. The rate for the reactants was: 1.1 gram moles per hour of methyl acetylene, 1.06 grams per minute of $Ni(CO)_4$ and 0.3 gm./ minute of anhydrous HCl. The alcohol is usually maintained in substantial excess.

The HCl flow was started shortly after the addition of $(Ni(CO)_4$ and methyl acetylene were begun. The reactor was maintained under atmospheric pressure and the stoichiometric reaction began about 16 minutes after starting the HCl flow.

A probe consisting of to platinum plates, ¼ inch square and ⅛ of an inch apart, was placed in a reactor containing methanol. As methyl acetylene and HCl were added the resistance dropped slowly from more than 6000 ohms to about 1000 ohms. As the reaction began to initiate the resistance dropped quickly to less than 200 ohms. Initiation is known to occur by the rapid absorption of gas, temperature rise, and color change from water white to a deep reddish brown. Sudden evolution of gas also occurs. The temperature was controlled at about 50° C.

On introducing carbon monoxide and additional methyl acetylene the resistance remained low. These gases were reacting since they were not leaving the reaction mixture.

The inlet flows were maintained constant and the stoichiometric reaction allowed to proceed before beginning the catalytic reaction. The methyl acetylene flow was then increased to 1.5 gm. mole/hr. and carbon monoxide was introduced at 0.4 gm. mole/hr. The catalytic reaction proceeded at 28.6%, as indicated by an almost complete lack of gas evolution and a rise in temperature. The temperature was maintained at about 50° C., by the use of warm water in the heating coils. After a few minutes, the methyl acetylene flow was gradually increased to 2.3 gm. mole/hr. and the carbon monoxide rate brought to 1.4 gm. mole/hr. The reaction was allowed to run for 2 hours at the rate of 55% catalytic and the liquid product collected.

On termination of the reaction, as noted by gas evolution, the resistance rose to 500 ohms. The resistance began to rise some two minutes prior to termination, thus anticipating the final result. The reaction could be reinitiated by turning off the carbon monoxide flow and reducing the methyl acetylene flow to its previous value of 1.1 gm. moles per hour. This occurred after 12 minutes with the resistance dropping to its former low value of under 200 ohms. This procedure was repeated several times demonstrating that the resistance measurement reflected the state of the reaction mixture, i.e. whether or not the reaction was taking place.

The gaseous product leaving the reactor was negligible, indicating almost complete absorption of all incoming gaseous feeds. The liquid product was collected.

Example 1(b)

A run similar to that described in Example 1(a) was made, using a conductivity cell with an effective area smaller than in Example 1(a). Here the resistance went from 100,000 ohms to less than 1500 ohms upon initiation. Upon initiation the flow rates of methyl acetylene and carbon monoxide were increased to 3.6 gm. moles/ hr. and 2.4 gm. moles per hour respectively. At these rates the catalytic level is 70.5%.

The liquid product was collected and samples were injected into a special gas chromatography unit arranged to decompose any excess $Ni(CO)_4$, thereby analyzing the product. This product consisted of 18.6% methyl methacrylate and 80.3% methanol.

The yield of desired product was 85.8%.

Example 2

In a similar manner, the carbonylation reaction between acetylene, carbon monoxide and methanol was carried out.

In this case where acetylene is reacted with carbon monoxide and methanol in the presence of nickel carbonyl, the desirable ester reaction product is methyl acrylate. As acetylene, nickel carbonyl and hydrogen chloride were added to methanol, the resistance drops from 100,000 ohms to less than 2,500 ohms, at which point the reaction is initiated. This is accompanied by an increase in temperature and a color change from water white to reddish-brown.

The flow rates prior to initiation were, acetylene 1.1 gm. mole/hr., Ni(CO)$_4$ 1 gm./min., and HCl 0.3 gm./min. These were added to 1060 ml. of methanol. Upon initiation the flow rate of acetylene was slowly increased to 2.8 gm. mol. per hour and carbon monoxide was slowly introduced at 1.5 gm. mol./hr. While the reaction is in progress the resistance remains at about the aforementioned value.

These flows were maintained for over two and one-half hours during which time the liquid product was collected and analyzed.

The yield of desired product was 77% based on acetylene.

What is claimed is:

1. The process for measuring the level of reactivity of a carbonylation reaction mixture which comprises reacting a mixture containing an organic compound capable of undergoing carbonylation, at least one substance capable of releasing carbon monoxide, and a compound having at least one active hydrogen atom in a carbonylation reaction and measuring an electrical property selected from the group of resistivity or conductance of said reaction mixture to thereby ascertain the activity of the reaction mixture.

2. The process for measuring the level of reactivity of a carbonylation reaction mixture which comprises reacting a mixture containing at least one organic compound having an acetylenic bond, carbon monoxide, and a compound having at least one active hydrogen atom in a carbonylation reaction and measuring an electrical property selected from the group of resistivity or conductance of said reaction mixture to thereby ascertain the activity of the reaction mixture.

3. The process of claim 2 in which the reacting carbonylation reaction mixture contains an alkanol as the compound having at least one active hydrogen atom.

4. The process for measuring the level of reactivity of a carbonylation reaction mixture which comprises reacting a mixture containing an organic compound having an acetylenic bond, carbon monoxide, a metal carbonyl, and an alkanol and measuring an electrical property selected from the group of resistivity or conductance of said reaction mixture to thereby ascertain the activity of the reaction mixture.

5. The process of claim 4 in which the reacting carbonylation reaction mixture contains methyl acetylene as the organic compound having an acetylenic bond.

6. The process of claim 4 in which the electrical property measured is resistivity.

7. The process of claim 4 in which the electrical property measured is conductance.

8. The process for controlling a carbonylation reaction which comprises reacting a mixture containing an acetylene compound, carbon monoxide, a metal carbonyl, and a compound having at least one active hydrogen in a carbonylation reaction and measuring an electrical property selected from the group of resistivity or conductance of said reaction mixture to ascertain the activity level of the reaction mixture, and adjusting the environmental conditions of the reaction mixture accordingly.

9. The process for controlling a carbonylation reaction which comprises reacting a mixture containing an acetylene compound, carbon monoxide, a metal carbonyl, and an alkanol and measuring an electrical property selected from the group of resistivity or conductance of said reaction mixture to ascertain the activity level of the reaction mixture, and adjusting the environmental conditions of the reaction mixture accordingly.

10. The process of claim 9 in which the acetylene compound is acetylene and the alkanol is methanol.

11. The process of claim 9 in which the acetylene compound is methyl acetylene and the alkanol is methanol.

References Cited

UNITED STATES PATENTS

| | | | |
|---|---|---|---|
| 2,582,911 | 1/1952 | Neher et al. | 260—486 |
| 2,962,525 | 11/1960 | Johnson et al. | 260—486 |
| 3,286,167 | 11/1966 | Gwyn | 324—65 |

JOHN H. MACK, *Primary Examiner.*

T. TUNG, *Assistant Examiner.*

U.S. Cl. X.R.

260—486; 23—230; 324—65, 71, 30